United States Patent Office 3,549,346
Patented Dec. 22, 1970

3,549,346
GRANULATION OF OIL-CONTAINING
SOLID FINES
William E. Savage, Castro Valley, Calif., assignor to
Shell Oil Company, New York, N.Y., a corporation of
Delaware
No Drawing. Filed Nov. 13, 1967, Ser. No. 682,513
Int. Cl. C05f *11/00*
U.S. Cl. 71—11                                                  3 Claims

ABSTRACT OF THE DISCLOSURE

An improved method for granulating liquid hydrocarbon containing water-soluble solid particle fines by subjecting such fines to a process capable of producing fresh or new surfaces thereon and thereafter compacting and granulating the thus treated fines.

---

The present invention relates to a new, novel and improved process for granulating water-soluble solid particle fines and more particularly to granulating hydrocarbon-containing water-soluble solid fertilizer fines which in the granulated form are easily handled and are attrition resistant.

BACKGROUND OF THE INVENTION

It is well known in the art that a desirable method of transporting water-soluble solids such as solid fertilizers, e.g., potash, phosphates, etc., is to form slurries of said solids in a liquid carrier and thereafter recovering the solid material from the liquid at a terminal end. In forming the slurry the solids are generally in very fine particle form which on recovery from the liquid are difficult to handle and not suitable for commercial use resulting in economic losses. Therefore, the solid fines are normally granulated by first compacting or densifying them and thereafter granulating the compacted or densified fines into granules of desired dimension.

Although water-soluble solid particle fines such as alkali metal salts, e.g., potash, can be granulated by suitable means such as mentioned, such materials which for some reason contain hydrocarbons such as petroleum oils become resistant to granulation by the above or any other known methods. Thus, water-soluble fines such as alkali metal salts or various other alkali compounds, e.g., potassium chloride, potash, potash salts, sodium chloride, muriate of potash (sylvite), soda ash, sodium sulfate, phosphate rock and the like, as well as various fertilizer materials which contain even less than a fraction of one percent of a liquid hydrocarbon which may be crude oil or fractions thereof are resistant to granulation necessary to meet standard commercial granulation requirement for standard grade. Solid particle fines which would normally contain liquid hydrocarbons are discussed in U.S. patent application Ser. No. 366,870, filed May 12, 1964, which relates to a method of recovering solid fertilizer particles from oil slurries by means of aqueous phase transfer. Although the separation process described in this application is extremely effective in recovering solid particles essentially free of liquid hydrocarbons, nevertheless it has been found that even such small amounts of less than 0.01% of oil or fractions thereof present in such oil recovered solid particle fines or when present as impurities or contaminants prevent granulation of the fines.

Conventional marketed sylvite is generally reconstituted by compaction followed by granulation. Sylvite has a density of 124.5 lb./cu. ft., and when KCl fines are compacted, the flakes tinkle like glass when rattled together. Particles of non-compacted sylvite have a hardness of 11 pounds or more.

Sylvite containing 0.3 and 1% oil cannot be compacted into a crystalline form by normal means known to the art. At best, it will form flat flakes resembling crumbled mica. Sylvite in that form is not acceptable in the fertilizer trade.

By solid particle fines is meant solid particle fines having generally dimensions of less than 60 mesh to less than 400 mesh and granular particles are within the meaning of the term used in the art as, for example, in the fertilizer industry and as defined above.

It is an object of the present invention to granulate water-soluble solid particle fines.

Still another object of the present invention is to granulate liquid hydrocarbon containing water-soluble solid particle fines.

Still another object of the present invention is to granulate liquid hydrocarbon containing water-soluble solid fertilizer fines.

Still another object of the present invention is to granulate potash fines containing small amounts of petroleum oil into granules which are resistant to attrition.

These and other objects will be apparent from the following description of the invention.

SUMMARY OF THE INVENTION

The present invention is directed to an improved, novel and new technique for grandulating liquid hydrocarbon-containing water-soluble solid particle fines comprising the following steps:

(1) the liquid hydrocarbon containing water-soluble solid particle fines is subjected to a chemical or mechanical attrition treatment, e.g., chemical etching or mechanical tumbling or grinding so as to form fresh, clean surfaces on the particle fines, (2) the fresh and clean surface particle are then compacted or densified preferably into thin sheets having a thickness of from about 0.05 to 0.5, and (3) the compacted or densified sheet can be flaked and then granulated or directly granulated into desired granular particle sizes.

If the liquid hydrocarbon content of the solid particle fines is above 1% or higher, it is preferable that prior to subjecting the fines to step (1), namely treating them in the same manner so as to obtain fresh or clean surfaces thereon, to heat-treating the fines by suitable means, e.g., vacuum or kiln drying, at temperatures which may range from about 200° F. to above 1000° F. so as to vaporize off the hydrocarbon and reduce its content to less than 1% and preferably to less than 0.3% by weight.

All of the process steps essential to the present invention should be preferably carried out at about ambient temperature and preferably in a continuous and interrupted manner.

A method for granulating solid fines such as potash particle fines which may contain from 0.1% to 1% oil by the process of this invention is to heat the fines to an elevated temperature of as high as 950° F. to reduce the oil content to less than 0.3% and preferably to less than 0.05%. The fines are then subjected at ambient temperature to tumbling or grinding or suitable methods to achieve formation of fresh, clean surfaces. The freshly surfaced particle fines are directly compacted into thin sheets of less than 0.25 inch thick and thereafter flaked and/or granulated into desired granular particle sizes. Without rendering these oil-containing particle fines to step (1) of the present invention such materials as oil-containing potash, e.g., sylvite, cannot be compacted and granulated satisfactorily to a salable product. Thus, step (1) can be regarded as the essential step in the process of granulating fines by the process of the present invention. Also, the temperature conditions and the continuous order of steps as outlined above are essential to achieving a successful granulation process in accordance with the teaching of the present invention.

PREFERRED EMBODIMENT OF THE INVENTION

A method to reconstitute potash fines, e.g., sylvite fines, recovered from a crude oil slurry such as would be used for pipeline transport of sylvite involved grinding before the usual roll compaction and granulation. The fines should preferably contain less than 0.1% oil, a level which can be readily achieved through improved phase separation step described in U.S. application Serial No. 654,416, filed July 19, 1967 which matured as U.S. Pat. 3,480,332, combined if necessary with drying in a rotary kiln or other suitable apparatus.

Fines containing 1% oil may be ground, compacted and granulated but fines containing less than 0.1% oil yield exceptionally strong granules by the process of the present invention. Without pregrinding, it is impossible to compact satisfactorily to a salable product potash, e.g., sylvite, or other fertilizer fines recovered from oil slurry to achieve acceptable particle geometries and acceptable recycle rates using ordinary compacting procedures.

As mentioned above it has been found that fines which are the subject of this invention are rendered uncompactable by oil residues can be made compactable by exposure of clean surface. Grinding to fracture particles and agglomerates is one method of creating clean surface although other means mentioned above can be used. Grinding is a preferred method and can be accomplished by passing the oil-containing sylvite through a two-roll granulator employing rolls set face-to-face. The rolls are generally restrained from moving apart by heavy springs. By this method it appears that fracturing of particles is minimized and probably most of the clean surface is found by dislodging very small particles which adhere to large particles to form the agglomerate typical of the unground material. Other types of grinders, such as attrition mills, may also be used to expose fresh surfaces.

The nature of compactable crystalline materials results in mergence of the individual particles into a continuous sheetlike crystal under extreme pressures of the compactor.

Fines not compacted fall through the flake breaker unchanged and can be returned to the compactor for further processing. The fines produced in breaking the compactor sheet can be mixed with these fines and returned to the compactor.

The flaked material can be put through a suitable granulator, e.g., a two-deck granulator, with, for example, granulator rolls in which one roll of each pair has longitudinal grooves and the other has circumferential grooves. Such rolls can produce −6 to +14 mesh granules (Tyler). Product from these rolls can be adjusted to produce 30% +6 mesh, 65% −6 to +30 mesh and 5% −30 mesh. The +6 oversize granules can be passed through rolls giving about 10% +6, 85% −6 to +30 and 5% −30.

The granulated product can be screened to remove granulator fines which can be sent to the compactor. In the complete scheme, granulator fines and compactor fines are combined and recycled to the compactor.

The effectiveness of granulating materials such as sylvite fines into products meeting commercial standards by the process of the present invention are illustrated by the following tests.

EXAMPLE I

That clean sites are essential to granulation by the process of this invention is substantiated by the fact that aging after grinding destroys the beneficial effect, presumably through redistribution of the film. For example, when ground sylvite fine feed was compacted 16 hours after grinding, the product crumbled to give a large proportion of fines upon granulation. Also, when the ground feed was immediately heated to 240° F. (30 minutes) and then put through the compactor, the resultant product was flaky and soft and not suitable for granulation.

EXAMPLE II

The effectiveness of the compaction of sylvite was measured by comparing the densities of the product with the density of the pure crystalline solid.

TABLE 1.—DENSITY OF COMPACTED SYLVITE
[KCl=124.5 lb./ft.³]

| Example | Density, lb./ft.³ | Oil content, percent |
| --- | --- | --- |
| (1) Not ground, compacted | 123.0 | None |
| (2) Ground and compacted | 119.9 | 0.3 |
| (3) Ground and compacted | 118.7 | 1.0 |
| (4) Ground and compacted | 124.0 | 0.037 |

EXAMPLE III

A test of product quality in regard to attrition resistance is its hardness expressed as the average force required to crush +10 mesh particles. The results on samples noted below were as follows:

TABLE 2.—HARDNESS OF COMPACTED SYLVITE

| Example | Hardness, pounds | Oil content, percent |
| --- | --- | --- |
| (1) Not ground, compacted | 9 | None |
| (2) Ground and compacted | 4 | 0.3 |
| (3) Ground and compacted | 1 | 1.0 |
| (4) Ground and compacted | 14 | 0.037 |

Thus, by the process of this invention, fines, e.g., sylvite fines, recovered from a crude oil slurry can be reconstituted to fertilizer grade granules (−6 to +30 mesh) preferably when the residual oil content is less than 0.1% and if the fines are preconditioned by grinding or similar means. The kind or degree of grinding can range over wide limits and seemingly mild grinding suffices. Although fines containing 1% oil can be compacted, the granules are of marginal strength and therefore it is desirable that the oil content does not exceed about 0.1%. In spite of the added grinding steps, reconstitution of recovered sylvite may be less expensive than compaction of oil-free sylvite because compaction efficiency is higher.

The foregoing description of the invention is merely intended to be explanatory thereof. Various changes in the details of the method may be made, within the scope of the appended claims, without departing from the spirit of the invention.

I claim as my invention:

1. In a process for compacting and granulating water-soluble solid fertilizer salt particle fines containing less than 1% oil, which are normally resistant to compacting and granulation, the steps comprising:
   (a) grinding or tumbling at ambient temperature water-soluble solid fertilizer salt particle fines containing less than 1% oil for a time sufficient to form fresh clean surfaces on said fines;
   (b) immediately compacting the new and clean freshly surfaced fines;
   (c) flaking the compacted fines; and
   (d) granulating the flakes.

2. The process of claim 1 wherein the fines are potash fines having particle sizes of less than −60 mesh to less than −400 mesh, the clean, fresh surfaces are obtained by grinding.

3. The process of claim 2 wherein the fines are sylvite having a crude oil content of less than 0.1%.

References Cited

UNITED STATES PATENTS 2,935,387   5/1960   Phillips _____ 23—313
3,365,279   1/1968   Marple, Jr. _____ 23—312
3,427,145   2/1969   West _____ 71—61

REUBEN FRIEDMAN, Primary Examiner

C. N. HART, Assistant Examiner

U.S. Cl. X.R.

71—51, 63, 64